US005198968A

United States Patent [19]
Galvagni

[11] Patent Number: 5,198,968
[45] Date of Patent: Mar. 30, 1993

[54] COMPACT SURFACE MOUNT SOLID STATE CAPACITOR AND METHOD OF MAKING SAME

[75] Inventor: John Galvagni, Myrtle Beach, S.C.

[73] Assignee: AVX Corporation, New York, N.Y.

[21] Appl. No.: 917,848

[22] Filed: Jul. 23, 1992

[51] Int. Cl.⁵ .............................................. H01G 9/00
[52] U.S. Cl. .................................... 361/529; 29/25.03
[58] Field of Search ............... 29/25.03; 361/400, 402, 361/403, 404, 529, 536, 535, 538, 539, 540

[56] References Cited
U.S. PATENT DOCUMENTS 4,984,134  1/1991  Locke .................................. 361/529

Primary Examiner—Donald A. Griffin
Attorney, Agent, or Firm—Mark T. Basseches

[57] ABSTRACT

An improved surface mountable tantalum capacitor and method of making same are disclosed. In accordance with the method of tubular tantalum container is fully or partially filled with tantalum powder, sintered to bond the powder to itself and to the container and thereafter conventionally processed to form dielectric and counter-electrode coatings. An anode termination is secured to an exterior surface of the container and a cathode termination is secured to a portion of the counter-electrode exposed through an opening in the container. The resultant capacitor is characterized by high capacitance per volume, a small footprint, shock resistance and low ESR.

20 Claims, 3 Drawing Sheets

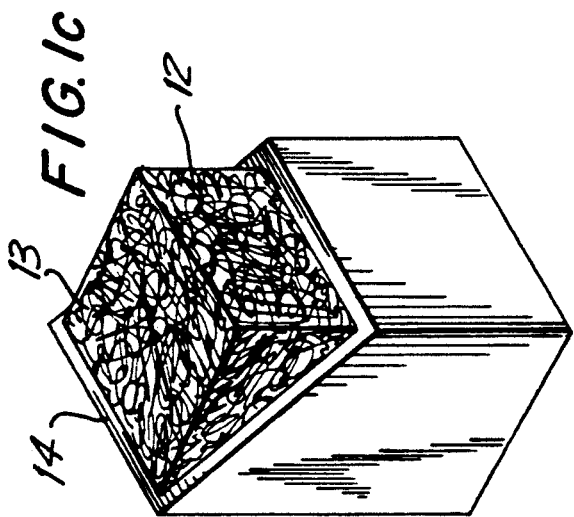
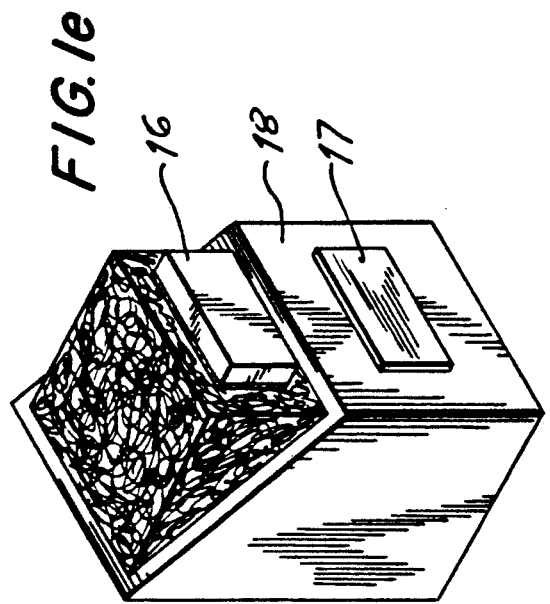
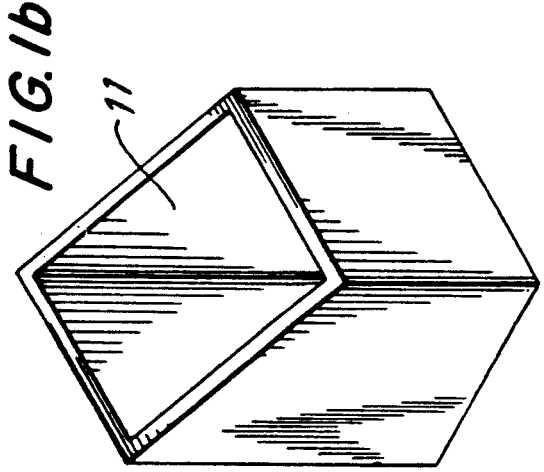
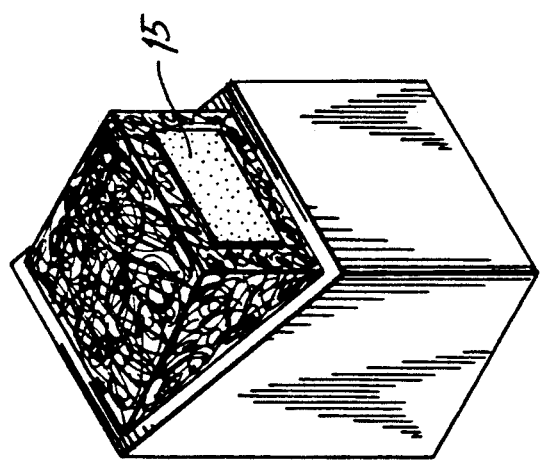
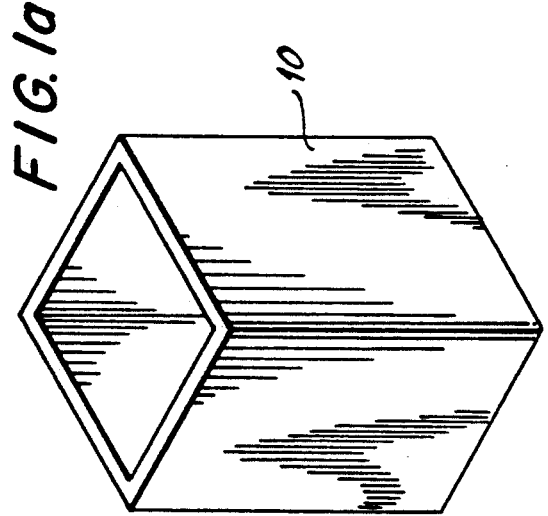

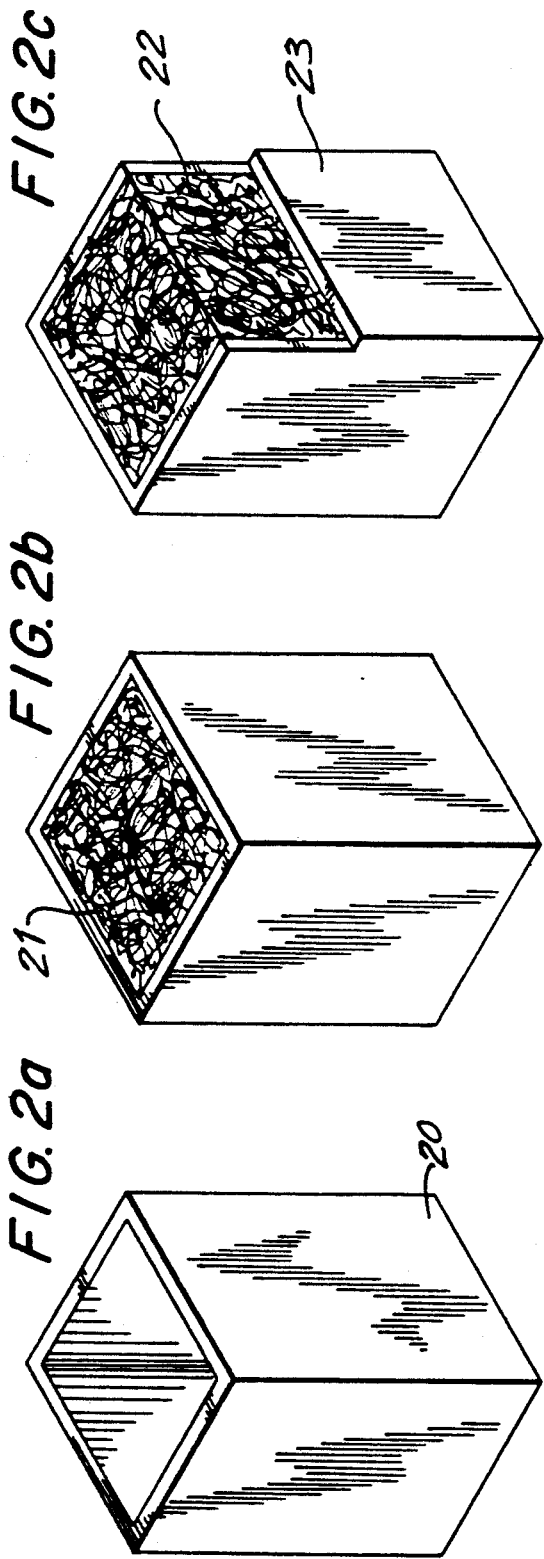

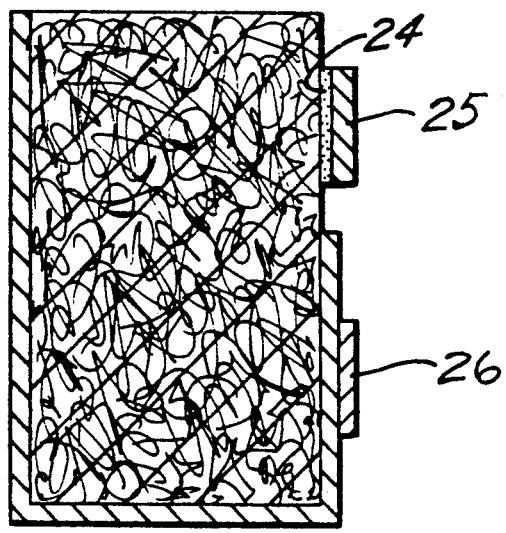
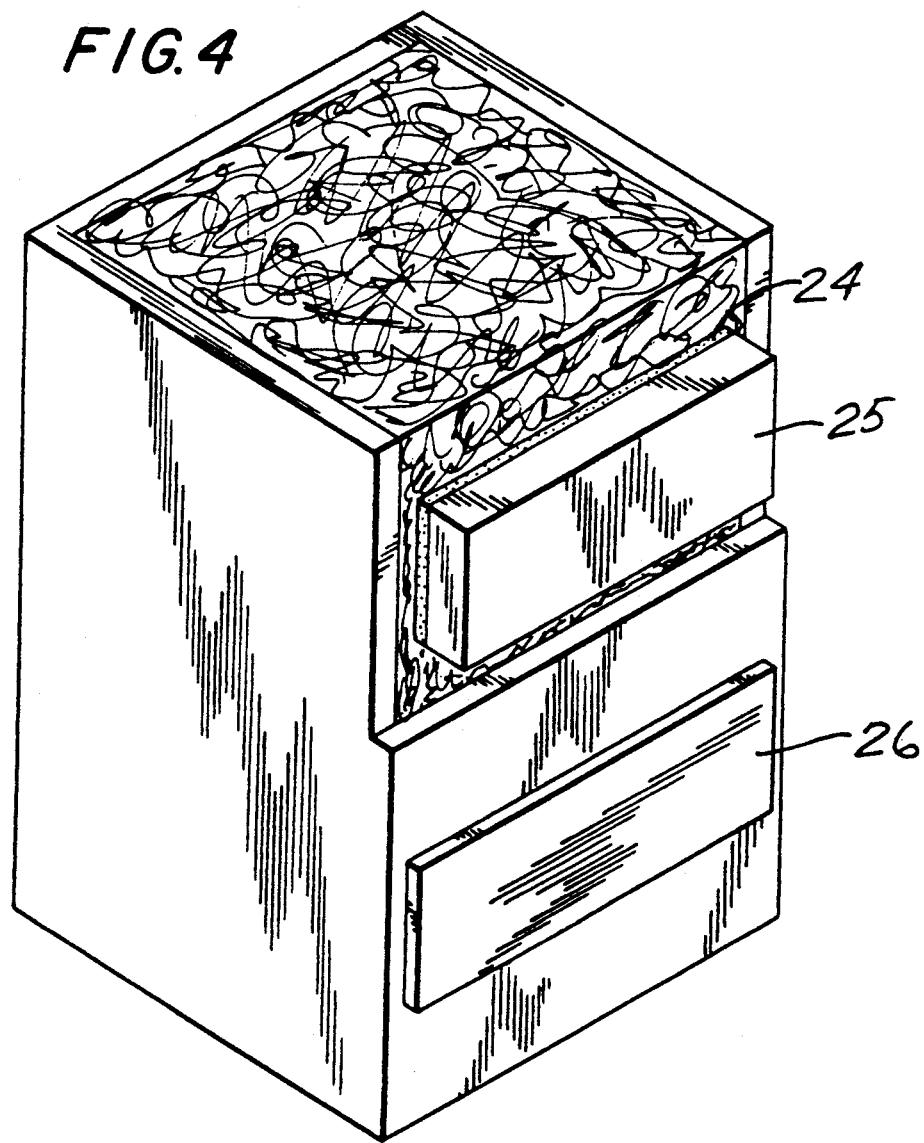

COMPACT SURFACE MOUNT SOLID STATE CAPACITOR AND METHOD OF MAKING SAME

BACKGROUND AND FIELD OF THE INVENTION

The present invention is in the field of solid state capacitors and is directed more particularly to a method of making a surface mountable tantalum capacitor and to the resulting capacitor. While the invention is considered to be particularly applicable to tantalum capacitors intended for surface mounting, it will be readily recognized that alternate terminating means, such as leads, may be employed in conjunction with the capacitor of the invention.

THE PRIOR ART

Tantalum capacitors are valued due in part to the fact that extremely high capacitances may be provided in a relatively small volumetric space. It is, for example, feasible to provide a tantalum capacitor having a value of 50 to 100 MFD of capacitance at working voltages of about 10 volts in a capacitor body having a volume of 0.027 cc. Much of the advantage of compactness, however, is lost as a result of the necessarily large encapsulation methods heretofore employed. With the increasing desire to miniaturize electronic components to be mounted on a PC board or the like, it is highly desirable even to further reduce the volume of space, and particularly the footprint of electronic components in general and capacitors in particular, so as to make most effective use of the exposed surfaces of PC boards.

Representative examples of conventional solid state tantalum capacitors and their method of manufacture are described and illustrated in U.S. Pat. Nos. 4,059,887; 4,520,430; 4,780,796 and 4,945,452. Common to the methods and structures of each of the noted references is fabrication which includes the steps of providing a metered quantity of finely divided tantalum powder, compressing the powder to define a pellet, sintering the pellet to form a porous mass of tantalum, attaching an anode rod of tantalum to the mass (either before or after the sintering step), treating the porous mass to form a dielectric coating over the interstitial spaces within the porous mass, forming a conductive surface over the dielectric, and attaching a cathode lead to the coating covering the dielectric, the anode lead being defined by the tantalum rod.

The thus formed capacitor must thereafter be encased in a protective encapsulation to which terminations, such as flexible leads, must be applied. Alternatively, the capacitor is mounted to a lead frame which in turn must be encapsulated. The requirement for encapsulation is in large measure engendered by the fact that the mechanical connection between the anode rod and the tantalum mass is extremely fragile. Since processing of the tantalum mass to convert same into a capacitor is typically effected utilizing the anode rod as a gripping means, it will be appreciated that significant care must be exercised to avoid dislodging the tantalum rod from the pellet during processing.

By way of example, U.S. Pat. No. 4,520,430 augments the connection between anode lead and tantalum mass by densifying an area at one end of the mass and welding the anode lead to the densified area.

U.S. Pat. No. 4,945,452, owned by the assignee of the instant application, augments the connection between tantalum mass and anode rod by inserting the rod into the mass and effecting a high degree of compression of the tantalum powder in the area surrounding the rod.

In order to assure that the rod does not break away from the treated tantalum mass, capacitors in accordance with U.S. Pat. Nos. 4,520,430 and 4,945,452 must thereafter be mounted to a ridigifying lead frame to which terminations are attached or, alternatively imbedded in a block of encapsulating resin.

A further solution to the provision of a durable tantalum capacitor is proposed in U.S. Pat. No. 4,059,887, owned by the assignee of the instant application. In accordance with this reference the capacitor is inserted into a metal casing, the anode lead is welded to a crossbar which is in turn welded to the casing, the casing is thereafter filled with rigidifying resin, and finally the casing is cut into two separate sections defining terminations, the sections being held together by the rigidified resin.

As a result of the inherent fragility of known tantalum capacitors, it has heretofore always been necessary to employ external rigidification, a procedure which in all instances involves significant volumetric increases in the capacitor structure, a factor counter-indicated in miniaturization. That is to say, in all known tantalum capacitors a significant proportion of the volume of the device is occupied not by working or capacitance generating elements, but by waste space occupied by lead frame structures rigidifying resins and the like.

A still further drawback inhering in the manufacture of all known tantalum capacitors resides in the necessity of compressing the tantalum powder, typically mixed with a binder, in order to form a coherent pellet. The inclusion of a binder mandates an additional burnout step before sintering of the pellet is possible. Further, compressing the tantalum powder with consequent increase in density renders the various impregnation steps necessary for forming the dielectric and counter-electrodes more difficult to accomplish.

SUMMARY OF THE INVENTION

The present invention is directed to a method of fabricating a high efficiency (capacitance per volume) tantalum capacitor and to the resultant capacitor. In accordance with the invention the anode is comprised of a tubular tantalum container which is filled with tantalum powder. Compression of the tantalum powder is not mandatory but may be desirable for use in situations where low working voltages will be encountered. The filled tantalum container is thereafter sintered to form the powder into a coherent porous mass which is electrically and mechanically connected to the tantalum container which forms the anode of the capacitor.

Optionally and preferably, the container is of tubular configuration at least one wall of which is flat and is formed (either before or after sintering) with an opening. The porous tantalum mass is subjected to conventional processing steps including anodizing to form a tantalum pentoxide dielectric layer. Thereafter the dielectric coating is formed with a counter electrode by conventional means namely impregnation with manganous nitrate followed by heating in a moist environment to convert the manganous nitrate to manganese dioxide. Thereafter a portion of the manganese dioxide coating exposed through the opening in the tantalum container is formed with a conductive area to which a termination may be attached. By way of example, but without limitation, a layer of graphite powder may be applied through the opening to which is applied a silver layer, a solder layer and finally the cathode terminal plate. An anode terminal plate is bonded to the exterior of the flat wall in parallel spaced relation to the cathode terminal whereby the device may be mounted on a PC board supported on the cathode and anode terminals.

From the foregoing, it will be appreciated that there is formed in accordance with the method of the invention a tantalum capacitor wherein virtually the entirety of the space within the tantalum-anode container is utilized as capacitance generating volume. The method has the further advantage of eliminating the difficult steps inherent in the manufacture of conventional tantalum capacitors including attachment of anode rods to tantalum pellet, burn-out of binder, welding of tantalum anode rods to terminations, compression of tantalum powders, etc. The resultant capacitor is highly advantageous in that due to the large connection area between the sintered tantalum powder and interior of the tantalum anode casing, there is virtually no chance of loss of electrical continuity between the casing-anode and the tantalum mass.

It is accordingly an object of the invention to provide an improved solid state tantalum capacitor and method of making same.

A further object of the invention is the provision of a miniaturized tantalum capacitor having a high capacitance to volume factor.

Still a further object of the invention is the provision of a capacitor of the type described having surface mount capabilities and providing an extremely small footprint per given capacitance.

A still further object of the invention is the provision of a capacitor which may be fabricated to a higher working voltage than tantalum capacitors heretofore known.

A still further object of the invention is the provision of a durable tantalum capacitor, and particularly a tantalum capacitor wherein the possibility of discontinuity between the anode terminal and anode forming portions of tantalum mass is virtually eliminated.

A further object of the invention is the provision of a method of manufacturing a solid state tantalum capacitor having the advantages hereinabove set forth.

BRIEF DESCRIPTION OF DRAWINGS

FIGS. 1a through 1e are schematic perspective views of a tantalum capacitor in accordance with the invention at sequential stages of its fabrication.

FIGS. 2a through 2e are view similar to FIG. 1 showing the sequential stages of fabrication of a modified form of capacitor.

FIG. 3 is a vertical sectional view through the capacitor illustrated in FIG. 2e taken on the lines 3—3 thereof.

FIG. 4 is a perspective view of a finished capacitor on an enlarged scale.

DETAILED DESCRIPTION OF DRAWINGS

Referring now to the drawings, there is shown in FIG. 1a through 1e in schematic fashion a capacitor fabricated in accordance with the method of the present invention.

In FIG. 1a there is disclosed a tantalum tube 10 which is rectangular in transverse section. In accordance with the embodiment of FIG. 1a through e an end portion of tube 10 is sawed at a 45 degree angle to define a diagonal opening 11. The tantalum tube is thereafter mounted within a mold conforming to the cross-sectional configuration of the tube 10 and of a height greater than the height of the tube. A charge of tantalum powder 12 is inserted into the mold and tamped in accordance with the desired density, so that the uppermost edge 13 of the tantalum powder charge is coextensive with the uppermost end 14 of the tantalum tube or container.

The tube 10 and tantalum charge 12 is thereafter sintered in a manner hereinafter set forth to fuse the tantalum powder into a coherent porous mass which is electrically and mechanically bonded to the tube 10. Sintering may be effected while the tube and tantalum powder are retained in the mold or after removal from the mold depending upon the degree of densification of the powder. Following sintering a dielectric coating is formed on the porous mass and the interior surfaces of the tube by an impregnation and anodizing step known per se and described in greater detail hereafter. Following formation of the tantalum pentoxide dielectric resulting from the anodizing step, a counter-electrode is formed over the dielectric layer in the interior of the tube by a conventional processing step involving impregnation with a solution of manganous nitrate and subsequent heating in moist atmosphere to convert the manganous nitrate to a solid conductive layer of manganese dioxide The dipping and heating steps are repeated to build-up the required thickness of manganese dioxide layering.

Preferably the exterior of the tub is isolated during the formation of the counter-electrode so as to avoid shorting between the tube which will form the anode of the capacitor and the counter-electrode which will form the cathode.

In FIG. 1c a conductive patch 15 has been applied to portions of the treat:d material exposed through opening 11. More particularly, the patch preferably is comprised of sequential layers of graphite powder, silver and solder.

As shown in FIG. 1e termination bars 16,17 are applied to the patch 15 and to wall 18 of the tantalum anode respectively, the bars 16, 17 forming the cathode and anode terminals respectively of the finished capacitor.

In FIGS. 2a through 2e there are schematically illustrated the sequence of steps of forming a capacitor in accordance with an embodiment of the invention.

A rectangular tantalum tube 20 is filled and tamped with tantalum powder 21 and subsequently sintered as shown in FIG. 2b. The device of FIG. 2b is thereafter machined or ground to form a opening 22 in the wall 23 of the tube 20. The article is thereafter treated as noted above, first to form the dielectric components and thereafter the counter-electrode coating. As before, there is shown in FIG. 2d a patch 24 formed on the exposed counter-electrode area accessible through opening 22. Cathode termination 25 and anode termination 26 are applied as in the prior embodiment.

The completed capacitor is shown in FIG. 3 (sectional view) and FIG. 4 in perspective. The thickness of terminations 25 and 26 are selected such that the outermost surfaces thereof are in coplanar alignment to which end the termination 26, being mounted to the exterior of the tantalum tube is thinner than that of termination 25. By this constructions, the capacitor may be mounted to the surface of a PC board with terminals 25,26 in registry with solder bumps on the PC board.

Processing Steps

The various processing steps involved in fabrication of the dielectric (pentoxide) and counter-electrode (manganese dioxide) are well known per se in conjunction with the manufacture of conventional tantalum capacitors. These steps are described in detail in U.S. Pat. Nos. 4,059,887 and/or 4,945,452 which are incorporated herein by reference.

Briefly, the tube members (10 or 20) are filled with tantalum powder which may or may not be densified depending upon intended end use characteristics of the capacitor. In order to facilitate filling, the tubes may be mounted within molds the heighwise dimension of which exceeds that of the tantalum tubes, the molds including a floor portion. The desired quantity of powder is disposed in the molds and tamped or permitted to remain undensified as desired.

As previously noted, in contrast to conventional tantalum capacitor manufacture, the powder may be retained in a less dense form than conventional whereby subsequent impregnation steps as hereinafter described may be more readily carrie out than is the case where heavy compression of the powder is required.

The filled tubes are sintered, the sintering operation being carried out at about 1600 degrees C. for approximately 15 minutes The sintering is carried out in high vacuum and provides a metallurgical bond between the particles themselves and between the particles and the tantalum case.

The next procedure involves the formation of the tantalum pentoxide dielectric. Preferably, the anodizing procedure which forms the pentoxide dielectric is effected while shielding at least certain portions of the exterior of the tantalum tube from the anodizing bath to assure that certain areas of the tube exterior remain free of dielectric coating. Anodizing is effected by immersing the tube in an electrolyte, i.e. 0.1 percent phosphoric acid, while connecting the exterior of the tubes to a positive source of DC current as respects a cathode immersed in the bath. Desirably, a spring clip is connected to the exterior of the tubes, the remainder of the exterior or at least portions thereof, particularly on the wall surfaces 18 and 23 (FIGS. 1 and 2 respectively), being masked against the formation of dielectric.

A counter-electrode is formed by dipping the capacitors in a solution of manganous nitrate and thereafter removing the capacitor and heating the device in a moist atmosphere to about 325 degrees C. to convert the nitrate to a solid manganese dioxide. This process is repeated a number of times to build-up the desired thickness.

At several stages during the counter-electrode build-up the anode may be subjected, as is conventional, to an electronic anode reformation step intended to heal the damage caused by heating.

The cathode terminations (16,25) are applied to the exposed areas of counter-electrode by first painting a patch or layer of the exposed counter-electrode with a suspension of graphite particles in aqueous ammonia. A suitable suspension is available from ACHESON COLLOIDS under the trading name AQUADAG.

Over the graphite coating which is dried, i.e. at 85 degrees C., a thin layer of silver paint is applied being a resinous organic solvent material carrying silver particles. The cathode terminations (16,25) are applied over the silver by soldering the external negative terminal plate to the silver coating.

Anode terminations (17,26) are thereafter bonded to exposed surface areas of the tube in parallel spaced relation to the cathode termination. In applying the anode termination care is taken to assure that the termination is applied to a cleared tantalum area free of pentoxide coating and free of any shorting connection between anode and cathode resulting from the formation of the counter-electrode. Desirably, a polishing or grinding step in the area to which the anode terminal is to be applied is effected.

Desirably, the masking procedure during formation of the dielectric and counter-electrode components is effected in a manner which maintains an area to coincide with the anode termination free of both the dielectric and counter-electrode coatings.

The anode termination may be a tantalum bar welded to the tantalum casing or may be bonded to the tantalum casing by conductive epoxy. The anode termination may be of a metal which can be welded to tantalum and plated to provide a solderable surface Examples of suitable, preferred metals are gold plated kovar and nickel.

Desirably, the exposed surfaces of the capacitor may be provided with an insulative protective layer, a suitable material for this purpose being a silicone varnish made by Miller-Stephenson and identified by the trade name MSI460. This material has the desirable attribute that it does not interfere with solderability should some of the varnish coat the exposed portions of the tabs.

As will be apparent from the preceding description there is formed in accordance with the invention an improved tantalum capacitor and method of making the same. The capacitor has the advantage of an extremely small volume and footprint, thereby comporting with miniaturization techniques. Since essentially the entirety of the device is functional in the context of providing capacitance, the volume and footprint are generally less than one half of that of the most compact surface mountable tantalum capacitors heretofore known.

Since the tantalum powder need not be densified to the degree necessary in conventional tantalum capacitors, there is achieved, in addition to economies, the ability to provide higher working voltages since it is possible to build-up thicker dielectric coatings in the non-densified capacitor than are available with the dense tantalum capacitors heretofore known. The capacitor further exhibits a lower ESR (equivalent series resistance) than conventional tantalum capacitors.

In addition to the capacitor providing a superior product, the method of manufacturing same affords substantial advantages. Due to the lower density of the tantalum sintered mass, the mass may be more readily impregnated throughout its entire extent and, thus, subject to being manufactured to higher tolerance standards than conventional capacitors. The difficult steps of bonding (by welding or densification) the powder to a tantalum rod is also eliminated. By utilizing the tantalum tube as the anode container, the danger of disconnecting the anode from the tantalum mass is virtually eliminated.

As will be apparent to a worker skilled in the art and familiarized with the instant disclosure numerous variations in details of construction and fabrication may be made without departing from the spirit of the invention.

Accordingly, the invention is to be broadly construed within the scope of the appended claims.

Having thus described the invention and illustrated its use, what is claimed as new and is desired to be secured by Letters Patent is:

1. The method of manufacturing a solid state tantalum capacitor which comprises the steps of providing a tantalum container having an opening, at least partly filling said container with tantalum powder, thereafter sintering said container and powder to bond said powder into a porous unitary mass mechanically and electrically coupled to said container, thereafter forming a dielectric coating on said porous mass and thereafter forming a cathode coating over said dielectric coating, portions of said cathode coating being exposed through said opening.

2. The method of claim 1 and including the steps of providing a cathode termination to said portions of said cathode coating exposed through said opening.

3. The method of claim 2 and including the step of applying an anode termination to an external portion of said container.

4. The method of manufacturing a surface mountable, sold state tantalum capacitor which comprises the steps of providing a tubular tantalum container having a flat wall portion including a throughgoing opening, at least partially filling said container with tantalum powder such that increments of said powder are in registry with said opening, sintering said container and powder to bond said powder into a porous unitary mass mechanically and electrically coupled to the interior of said container, thereafter forming a dielectric coating on said porous mass, thereafter forming a conductive cathode coating over said dielectric coating, portions of said cathode coating being exposed through said opening, applying a cathode termination to said exposed portions of said cathode coating, and applying an anode terminations to said wall portions of said container in spaced relation to said cathode termination.

5. The method of claim 4 wherein said cathode and anode terminations include external portions in coplanar alignment.

6. The method in accordance with claim 1 and including the step of masking external portions of said container during formation of said dielectric and cathode coating, applying a cathode termination to said exposed portions of said cathode coating and applying an anode termination to external portions of said container masked during formation of said dielectric and cathode coatings.

7. The method in accordance with claim 6 wherein said anode and cathode terminations are generally flat and disposed in coplanar alignment, 8. The method of claim 7 wherein said container includes a flat wall portions and said opening is formed in said wall portion.

9. As a new article of manufacture a solid state tantalum capacitor comprising a tantalum container having an opening, a sintered porous tantalum mass disposed within and electrically coupled to the interior of said container, said mass corresponding generally to the interior dimensions of said container, a dielectric coating formed on said mass, a conductive coating covering said dielectric coating, said conductive coating being electrically isolated from said container, portions of said coating being exposed through said opening, a cathode termination secured and electrically coupled to said exposed portion of said conductive coating and an anode termination secured to and electrically coupled to an exterior surface of said container in spaced relation to said anode termination.

10. A capacitor in accordance with claim 9 wherein said cathode and anode terminations include exterior surfaces in generally coplanar alignment.

11. A capacitor in accordance with claim 10 wherein said container comprises a tube having at least one planar wall portion, said opening is formed in said wall portion, and said anode termination is bonded to an external surface of said wall portion.

12. A solid state capacitor made in accordance with the method of claim 1.

13. A solid state capacitor made in accordance with the method of claim 2.

14. A solid state capacitor made in accordance with the method of claim 3.

15. A solid state capacitor made in accordance with the method of claim 7.

16. A solid state capacitor made in accordance with the method of claim 8.

17. A solid state capacitor made in accordance with the method of claim 4.

18. A solid state capacitor made in accordance with the method of claim 5.

19. A solid state capacitor made in accordance with the method of claim 6.

20. A solid state capacitor made in accordance with the method of claim 9.

* * * * *